(12) United States Patent
Nyman et al.

(10) Patent No.: US 7,465,402 B2
(45) Date of Patent: Dec. 16, 2008

(54) METHOD AND EQUIPMENT FOR GUIDING DISPERSION IN LIQUID-LIQUID EXTRACTION

(75) Inventors: Bror Nyman, Ulvila (FI); Stig-Erik Hultholm, Pori (FI); Eero Ekman, Pori (FI); Launo Lilja, Pori (FI); Juhani Lyyra, Espoo (FI); Pertti Pekkala, Espoo (FI); Raimo Kuusisto, Espoo (FI)

(73) Assignee: Outotec Oyj, Espoo (FI)

( * ) Notice: Subject to any disclaimer, the term of this patent is extended or adjusted under 35 U.S.C. 154(b) by 505 days.

(21) Appl. No.: 10/515,088

(22) PCT Filed: May 15, 2003

(86) PCT No.: PCT/FI03/00377

§ 371 (c)(1),
(2), (4) Date: Nov. 16, 2004

(87) PCT Pub. No.: WO03/097206

PCT Pub. Date: Nov. 27, 2003

(65) Prior Publication Data

US 2006/0049104 A1    Mar. 9, 2006

(30) Foreign Application Priority Data

May 16, 2002   (FI)   .................. 20020925

(51) Int. Cl.
| | |
|---|---|
| *B01D 11/02* | (2006.01) |
| *B01D 12/00* | (2006.01) |
| *B01D 17/028* | (2006.01) |
| *B01D 21/02* | (2006.01) |
| *B01D 17/00* | (2006.01) |

(52) U.S. Cl. .............. 210/802; 210/634; 210/511; 210/521; 210/532.1; 422/256

(58) Field of Classification Search .............. None
See application file for complete search history.

(56) References Cited

U.S. PATENT DOCUMENTS

| 2,708,520 | A | * | 5/1955 | Dallas ................. 210/525 |
| 4,469,582 | A | * | 9/1984 | Sublette et al. ......... 204/666 |
| 4,643,834 | A | * | 2/1987 | Batutis ................. 210/740 |
| 4,747,948 | A | * | 5/1988 | North .................. 210/633 |

(Continued)

FOREIGN PATENT DOCUMENTS

AU    74258/94    12/1997

(Continued)

*Primary Examiner*—Krishnan S Menon
(74) *Attorney, Agent, or Firm*—Morgan & Finnegan, L.L.P.

(57) ABSTRACT

The invention relates to a method for guiding a dispersion of two liquids formed in the mixing stage of liquid-liquid extraction along the longitudinal axis of the separation section in the feed end of an extraction separation section. In particular the method and equipment relate to the extraction process used in the recovery of metals. In accordance with the method the dispersion to be fed into the separation section is guided so that it spreads evenly over the cross-section of the separation section using a directional member placed so as to obtain a vertical flow. The equipment in accordance with the invention consists of a directional member, which is in turn made up of at least two separate parts.

35 Claims, 3 Drawing Sheets

U.S. PATENT DOCUMENTS

| | | | |
|---|---|---|---|
| 6,099,743 A * | 8/2000 | Pedersen | 210/801 |
| 6,132,615 A * | 10/2000 | Nyman et al. | 210/634 |
| 6,558,558 B1 * | 5/2003 | Hall | 210/802 |
| 2003/0127376 A1 * | 7/2003 | Maddock et al. | 210/114 |

FOREIGN PATENT DOCUMENTS

| | | |
|---|---|---|
| DE | 29 22 721 | 12/1980 |

* cited by examiner

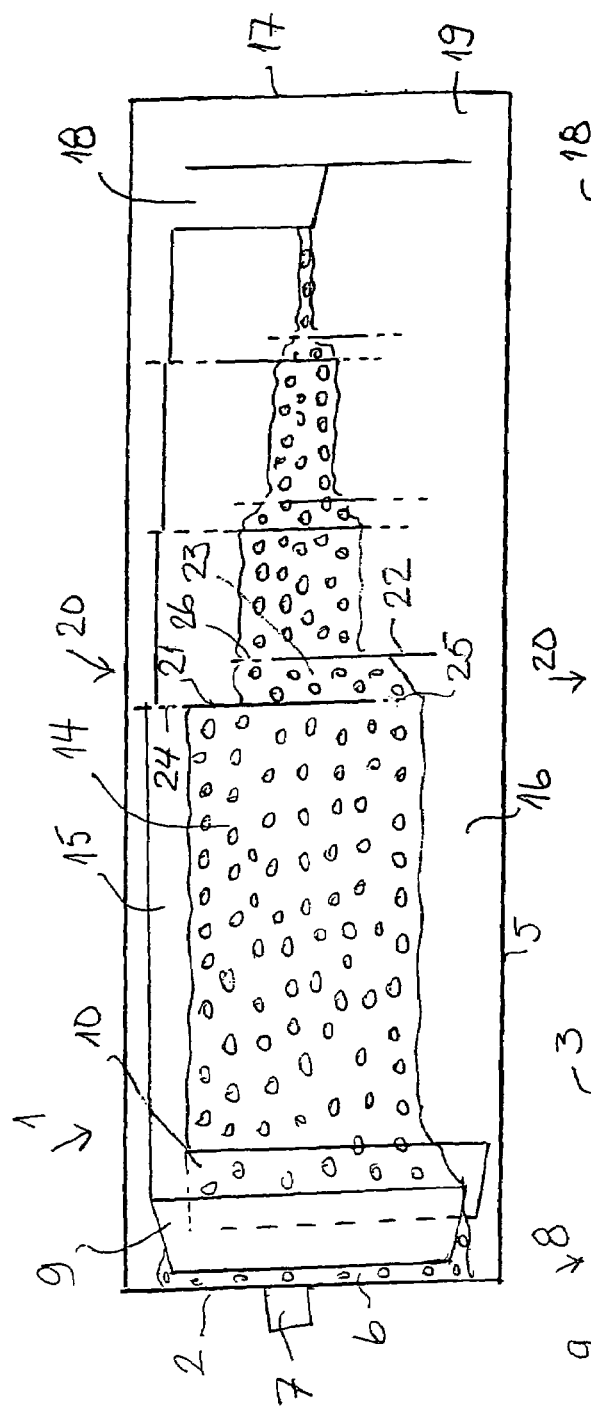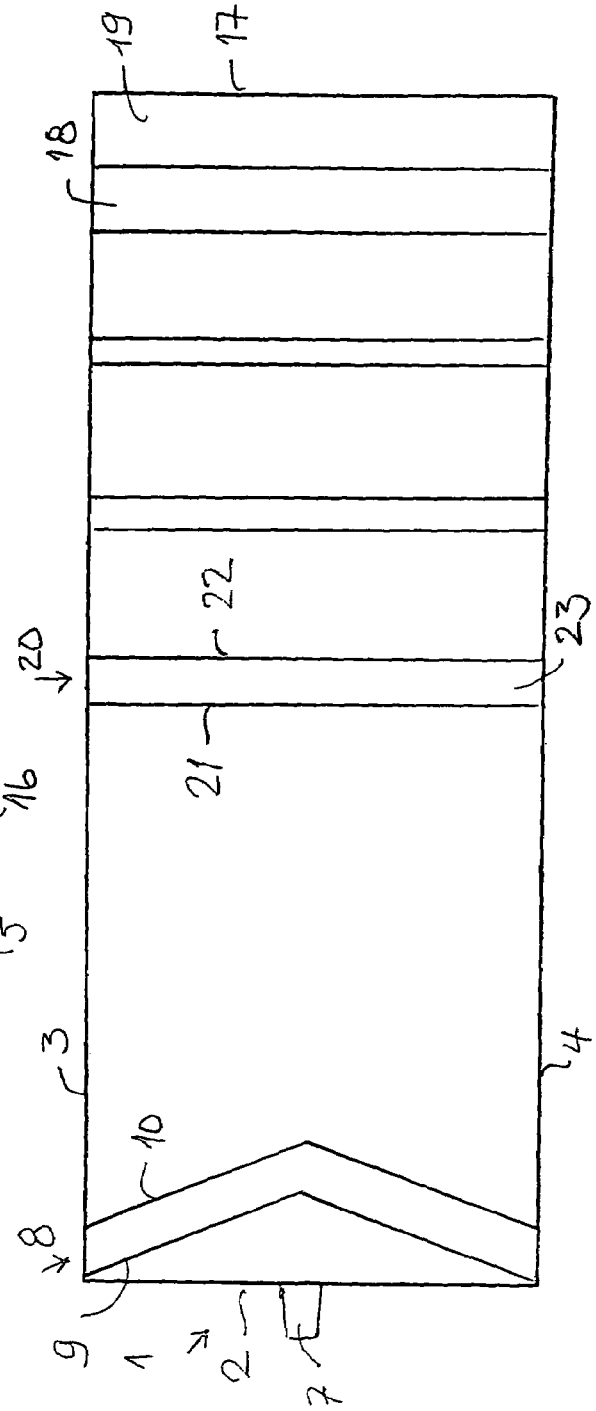

METHOD AND EQUIPMENT FOR GUIDING DISPERSION IN LIQUID-LIQUID EXTRACTION

FIELD OF THE INVENTION

The invention relates to a method for guiding and directing a dispersion of two liquids formed in a mixing stage of liquid-liquid extraction along the longitudinal axis of the separation section in the feed end of an extraction separation section. In particular the method and equipment relate to the extraction process used in the recovery of metals. In accordance with the method the dispersion to be fed into the separation section is guided so that it spreads evenly over the cross-section of the separation section using a directional member placed so as to obtain a vertical flow. The equipment in accordance with the invention consists of a directional member, which is in turn made up of at least two separate parts.

BACKGROUND OF THE INVENTION

Liquid-liquid extraction has been used earlier in the metallurgical industry typically in the processing of solutions with a weak valuable metal content. Many large copper and uranium recovery extraction plants fall into this category. With regard to copper, however, the situation is changing, because the extraction feed solutions are becoming noticeably stronger with the pressurised concentrate leaching processes coming into operation. Likewise some cobalt and zinc extraction processes also treat strong feed solutions. Nevertheless, the size of the equipment, particularly in the case of copper, will generally remain large, also in the new pressurised leaching processes.

In all extraction processes a precious metal-containing aqueous solution is brought into contact with an organic solution in the extraction mixing section, forming a dispersion of two solutions that are insoluble in each other. The solutions in the dispersion are separated from each other in the separation section of extraction, where the solutions separate from each other into two layers with a dispersion band remaining between them. During the mixing stage either one or more of the valuable metals in the aqueous solution is transferred to the organic phase, from which the valuable metals are recovered by stripping the aqueous solution. Extraction is performed in an equipment, where the mixing and separation sections are either located one on top of the other (column) or in series on more or less the same level horizontally. Almost always in cases when large-scale extractions of weak solutions are concerned, such as copper extraction, the equipment is positioned in an essentially horizontal position. When we refer to extraction hereinafter, the term is used for various arrangements, but essentially equipment in the same level.

U.S. Pat. No. 6,132,615 describes a method and equipment for regulating the rate of extraction solutions in an extraction separation section. The method and equipment are based on several picket fences, of a form designated in the publication, located at the front end of the separation section. The picket fences extend across the settler to its sides. Vertically the picket fences extend up to above the liquid surface and without exception down to the bottom of the settler. The vertical control of the aqueous solution layer has been improved so that the dispersion band is made to extend as far as the farthest end of the separation section especially when the dispersion is of a water droplet dispersion type. The dispersion and the solution phases separated from it are forced to flow through a picket fence in at least three places in the separation section concerned. The picket fences are vertical slots of construction. The publication states that a strong dispersion band improves the performance values of the separation section in terms of both the quantity and quality of the separated solutions. A picket fence enables an increase of flow resistance in the separation section in the range of 250-600 Pa per fence. In a certain way shaped picket fences are a fairly good solution in many situations.

WO patent application 99/11830 describes a method and equipment for liquid-liquid extraction, where the dispersion coming from the mixer is fed into the bottom section of the settler and is directed from there firstly to a distribution channel located inside the settler. In the distribution channel the dispersion flows first in accordance with the main flow direction of the settler, but the direction of the flow is turned so that the dispersion is discharged into the actual settler space above the distribution channel, from the front part of the feed end.

SUMMARY OF THE INVENTION

Now a method has been developed to guide the dispersion of different phases formed in liquid—liquid extraction in the feed end of an extraction separation section. The dispersion is fed from the extraction mixing section into the centre of the feed end of the separation section. In order to distribute the dispersion evenly over the whole cross-section area of the separation section a guiding directional member is used, which comprises at least two directional plates. Using the first directional plate the dispersion is made first to flow via the bottom of the separation section and then to flow almost vertically in the directional channel between the directional plates. The dispersion is discharged from the directional member into the separation section above the last directional plate, where the separation of the phases of the dispersion takes place.

The equipment in accordance with the invention consists of a directional member placed in the feed end of the settler, which is made up of at least two essentially solid plate-like parts, set in series in the same direction. The plate-like parts are located at different depths. The plate-like parts, the directional plates, are in addition located so that their outer edges extend to the sidewalls of the settler and the central part further than the outer edges when seen in the direction of flow in the settler. The direction of flow of the dispersion in the directional channel between the directional plates is almost vertical, since the dispersion is made to flow first under the first plate into the first channel and from there on over the next plate into the next directional channel or into the separation section itself. The directional member is meant to be positioned at different stages of extraction such as both in the actual extraction and also in any washing and stripping, located in the feed end of the settler.

The essential features of the invention will be made apparent in the attached claims.

The method and equipment in accordance with the invention replace the picket fence conventionally used in the feed end of the separation section (settler). The method and equipment make it possible to get the dispersion fed into the feed end of the separation section to spread out evenly across the total width of the separation section with a small flow resistance. The flow resistance caused by the directional plates is only in the range of 100-200 Pa, which is far less than for picket fences arranged with slots. One aim of the method in the present invention is to speed up the separation of the solutions from the dispersion and to improve the final settling efficiency of the solutions i.e. to reduce the entrainment of each solution in the other. The V-shaped directional member enables the flow entering the central part of the separation section feed end to be evened out across the entire width of the separation section.

In the equipment according to the invention the directional member is located in the feed end of the separation section or settler so that the edges of the directional plates of the directional member extend to the sidewalls of the settler near the feed end of the settler. Seen from above, the directional member is preferably V-shaped narrowing towards the centre of the settler. The directional plates are essentially solid, however, so that the lower edge of the first plate and the upper edge of the second plate are provided with vertical slots, which are 3-15% of the total height of the plate. The upper edge of the first plate extends above the surface of the liquid and this upper edge is also preferably provided with vertical slots, which are 3-15% of the total height of the plate. The distance of the directional plates from each other is basically the same along the whole length. The distance is determined so that the flow rate the dispersion flowing between them is of the order of 0.1-0.5 m/s. The directional member is placed in a basically upright position.

The position of the second (last) directional plate in the settler can be adjusted and the location of the upper edge of the plate can determine what the height of the upper edge of the dispersion will be when it is discharged from the directional member. Likewise the plate determines the thickness of the layer of extraction solution. In turn the thickness of the extraction solution layer determines how cleanly the extraction solution will be separated from water droplets.

The lower edge of each directional plate can be inclined towards the tip so that the distance of the directional plate from the bottom of the settler is greater in the region of the sidewalls than it is in the centre of the settler (on the longitudinal axis of the settler). The angle of deflection of the lower edge is around 0.2-2° to the horizontal. At the centre of the plate, the lower edge of the first plate is situated above the bottom of the settler at a height that is 3-25% of the depth of the solution in the settler. The second directional plate is attached to the settler so that the distance of its lower edge from the bottom of the settler at the centre of the plate is between 0.5-5% of the depth of the solution in the whole settler. The upper edge of the second directional plate is below the surface of the solution in the settle at a height that corresponds to 10-20% of the depth of the solution in the whole settler. The upper edge of the directional plates can be made basically horizontal or it can be sloped, but now rising from the edges towards the centre of the settler at more or less the same angle as the corresponding lower edge of the plate. Thus the slot sector of the upper edge rises towards the centre.

If a third and fourth directional plate is used in the directional member, the third should be located at a height where its lower edge is 5-15% higher than the lower edge of the first plate and correspondingly the lower edge of the fourth plate is 5-15% higher than the lower edge of the second plate.

It is possible to combine the method and equipment in accordance with the invention either with picket fences of the prior art located behind the settler directional member (seen in the direction of flow) or with one or more revert members.

When revert members are used, the phases separated from the dispersion are made to flow relatively freely along the longitudinal axis of the separation section, but the unseparated dispersion is dammed up using at least one damming revert member placed in the separation section. The revert member extends right up to the sidewalls of the separation section. The equipment in accordance with the invention comprises at least one revert member located in the settler (separation section), said revert member is formed of at least two, plate-like sections, or revert plates, which are at different heights and essentially set perpendicularly to the longitudinal axis of the settler (in the direction of the solution flow). In the area formed between the revert plates, the revert channel, the direction of the dispersion flow is almost vertical, because the dispersion is made to flow above or below each revert plate into the revert channel. Changing the direction of flow of the dispersion at least once in the separation section improves the separation of the dispersion into pure solution layers above and below the dispersion. The revert member can be positioned at different stages of extraction such as both in the actual extraction and also in any washing and stripping separation sections.

The dispersion stream is prevented from flowing forwards directly in the settler at least once by arranging at least one revert member extending above the separation section. In order for the dispersion to move past the revert member, in the first stage it must be pressed against the first plate-like part of the revert member and under it into the revert channel, which is formed between the plate-like parts of the revert member. From the revert channel the dispersion surface is made to rise so that it is able to flow over the second plate-like part of the revert member. The number of revert members in the separation part of the extraction is at least one, but can vary for instance between 1 and 6. There are at least two plate-like parts in one revert member, but the number of said parts can also vary for instance between 2 and 6. The first plate-like part of the revert member and subsequently every second part is located essentially higher in the separation section than the second plate-like part and every other part after that.

The first plate-like part belonging to the revert member, i.e. the first revert plate, is located in the separation section at a level where its upper edge extends above the dispersion band into the organic solution phase. When the separated solutions and the dispersion band between them flow from the feed end of the separation section towards the discharge end, the dispersion band is pressed against the first revert plate. The positioning of the revert plates determines the desired thickness of the organic solution layer. The dispersion should accumulate in such quantities that because it is heavier than the separated organic solution it penetrates through the riser channel or channels between the revert plates to the next section of the separation section, where the thickness of the layer of separated solutions is greater than in the previous section. The organic and aqueous solutions that have already separated into their own phases, are able to flow freely at the revert member into the next section of the separation section, but the dispersion has to collect into a layer of sufficient thickness before it is able to access the next section of the separation section via the revert member. The dispersion moves forward only when the separation section is charged with a sufficiently large flow. The larger the settler, the larger the flow required. A dense dispersion attains an improved degree of solution separation, in other words, the amount of entrainment in each solution is decreased.

The first revert plate is mainly solid, but has vertical slots in its upper section, which ensure an even flow-through of the organic solution at the revert member along the whole length of the separation section. The first revert plate extends above the surface of the organic solution, as do the slots in its upper edge. The slots going down from the top edge of the revert plate reach a depth equivalent to a maximum of half that of the thickness of the layer of separated organic solution. The slotted zone accounts for about 5-15% of the total height of the revert plate. The lower edge of the first revert plate extends to the bottom part of the separation section, but however to such a distance from the bottom that it is within the prevailing dispersion layer. The distance of the lower edge from the bottom is greater the further away the revert member is from the feed end of the separation section. In practice, the lower edge of the first revert plate is at a distance from the bottom that is 12-50% of the total depth of solution in the separation section (settler).

The second revert plate of the revert member is the same type as the first i.e. basically solid. The lower edge of the second revert plate is placed far lower than the lower edge of the first revert plate, but however, so that there is space for the separated aqueous solution to flow unimpeded. The distance of the lower edge of the second revert plate from the bottom depends on the location of the revert member in the separation section. The lower edge of the revert plate is higher in the separation section, the further away the revert member is from the feed end of the separation section. In practice, the lower edge of the second revert plate is at a distance from the bottom that is 5-35% of the total depth of solution in the separation section. The upper edge of the second revert plate is located below the surface of the organic solution, and the distance of the upper edge from the surface of the organic solution is greater the further away the revert member is from the feed end of the separation section. In practice, the upper edge of the second revert plate is at a distance below the surface of the solution that is 12-35% of the total solution depth in the separation section.

The even distribution of the dispersion into the revert channel and an even flow out of it is made easier if the lower end of the first revert plate of the revert member is also provided with an equivalent type of slotted zone as that on the upper end of the same revert plate. Likewise, it is preferable to furnish the top end of the second revert plate with a slotted zone and the purpose of the slots in this case too is to promote the even distribution of the dispersion into the separation section. If the revert member is composed of several revert plates, the slotted zones are located on the upper and lower edges of the corresponding plates. The height of the slotted zones on the lower edge of the first revert plate and the upper edge of the second plate is in the range of 5-15% of the height of the revert plate.

If the revert member is made up of more than two revert plates, the bottom clearance of the lower edge of the third revert plate is 0-30% larger than that of the first revert plate. The distance of the third revert plate from the surface of the organic solution is 10-30% smaller than the distance of the second plate. Both the bottom clearance and the distance from the surface of the organic solution of the fourth revert plate are 0-30% greater than that of the second revert plate.

The use of a revert member reduces the amount of organic solution entrainment in the aqueous solution, so that the entrainment content in the aqueous solution entering stripping remains less than 10 ppm, generally between 2-7 ppm. For example, in copper extraction the recovery of copper takes place by electrolysis in an electrowinning circuit. The electrolysis process cannot tolerate an organic solution, and if the solution entering electrolysis is not sufficiently pure, it must be purified for example by flotation or pressure filtration. The use of a revert member facilitates the direct routing of the solution produced in extraction to further processing without separate purification stages.

An arrangement in accordance with this invention enables the reduction of the amount of the dispersion that remains unseparated at the tail end of the separation section so that it is at most 10% of the thickness of the streams in the separation section. It is also possible using this method to regulate the thickness of the layer of organic solution. The thickness of the layer of organic solution is regulated gradually in accordance with the number of revert members used.

The method and equipment are intended particularly for the extraction of metals, where the metal to be recovered is one of the following: copper, uranium, cobalt, nickel or zinc.

BRIEF DESCRIPTION OF THE DRAWINGS

The invention is described further in the attached drawings, where

FIG. 3 shows a cross-section of a settler, where revert members have been located, FIG. 4 shows the settler of FIG. 3 as seen from above.

DETAILED DESCRIPTION OF THE INVENTION

Figure 1:
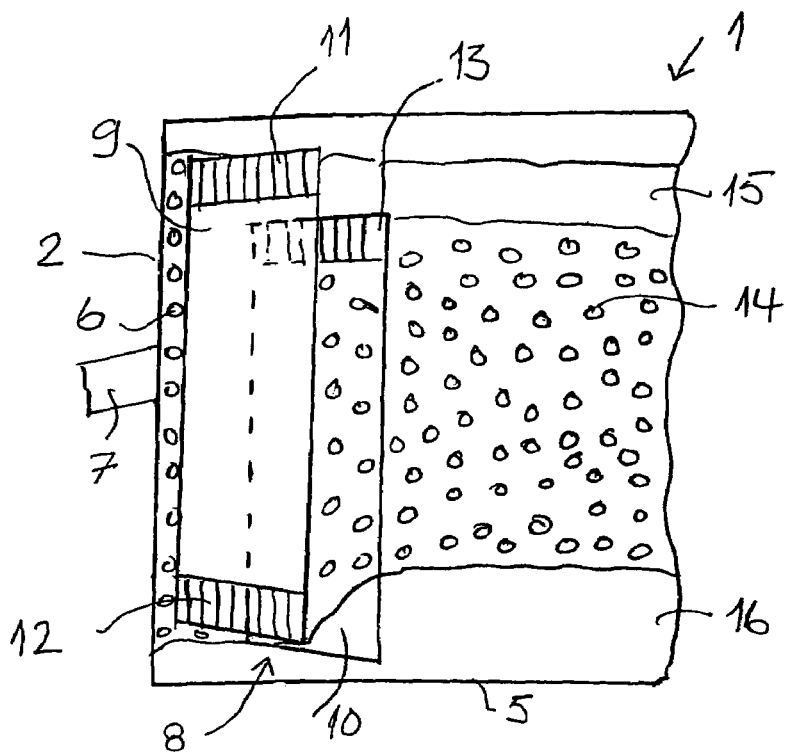
FIG. 1 is a cross-section of a feed end of a liquid-liquid extraction settler in accordance with the invention.
Figure 2:
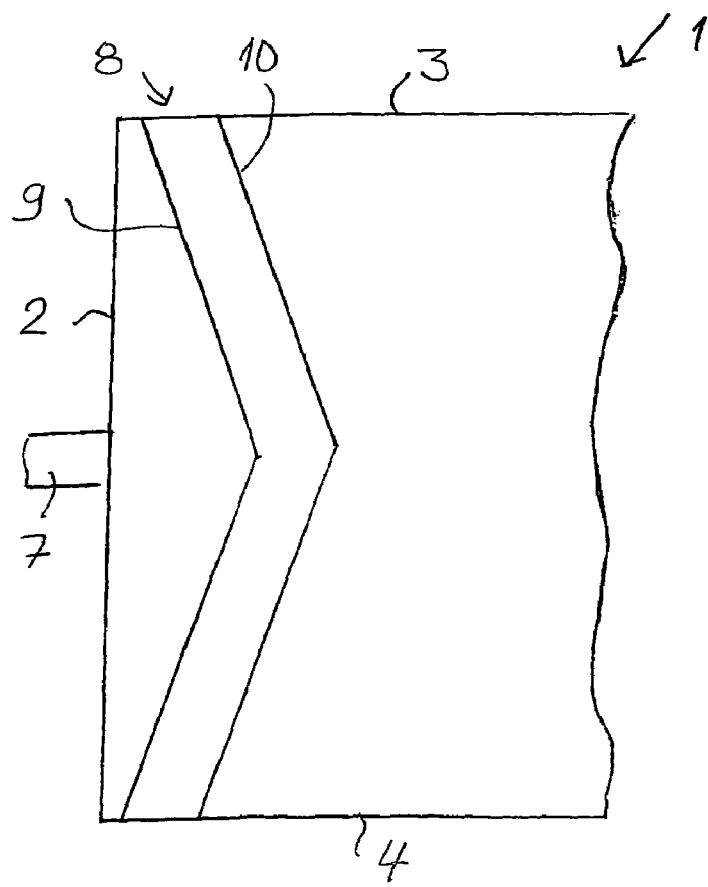
FIG. 2 is the settler feed end in FIG. 1 as seen from above.

FIGS. 1 and 2 show the feed end 2 of a settler (separation section) 1, sidewalls 3 and 4 and bottom 5. The discharge end of the settler is not shown in the drawing. In the mixer (not shown in the drawing), a dispersion 6 of two mixed phases is fed to the feed end of the settler via a feed connection 7. A directional member 8 is placed in the immediate vicinity of the feed end and comprises at least two directional plates 9 and 10. The directional plates are preferably supported at the edge to the sidewalls of the settler. At the centre the plates are bent towards the longitudinal axis of the settler (direction of flow). The plates are placed preferably in a V-shape.

FIG. 1 shows that the upper edge 11 and the lower edge 12 of the first directional plate are provided with vertical slots, as is the upper edge 13 of the second directional plate. An organic solution layer 15 forms above the dispersion band 14 and an aqueous solution layer 16 forms below it. The drawing also shows that the lower edge of the directional plate slopes towards the centre and correspondingly the upper edge rises towards the centre.

FIGS. 3 and 4 show the whole settler 1, and also the rear end 17 of the settler. FIG. 3 shows that the that in the front end of the settler the solutions have separated into their own phases only a little and that the dispersion band is dominant at the front end of the settler. The separated solutions are discharged at the rear end of the settler, where there is the first organic solution launder 18 in the direction of the flow, into which the organic stream flows as the overflow and is routed onwards from there. The aqueous solution is collected in what is known as a water end 19, to which the aqueous solution flows below the organic solution launder.

Revert members 20 as shown in FIGS. 3 and 4, in this case three of them, can be placed in a settler equipped with directional members in accordance with the invention. Each revert member is composed of two revert plates 21 and 22 and the revert channel 23 formed between them. The revert plates are located in the settler so that they lie crosswise in relation to the longitudinal axis (the direction of flow). The section of the revert plates with vertical slots is shown in the side elevation by a dotted line; the rest of the plates are solid. Thus the top 24 of the first revert plate 21 is provided with vertical slots as is the bottom 25 of the plate and the top 26 of the second revert plate. The position of the revert member in the settler can be determined as required. The use of revert members makes it possible to keep the dispersion band thick in the front end of the separation section, which promotes good drop separation. Thus it is advantageous that the thickness of the dispersion band at least in the first third of the separation space is approximately 75% of the depth of the solution and reduces gradually so that the thickness of the dispersion remaining unseparated at the tail end of the separation section is as small as possible.

FIG. 3 shows that the distance of the revert plates from each other can also be changed so that the distance between them becomes smaller in the direction of flow. The distance between the plates is measured in such a way that the flow rate of the dispersion in the revert channel between them is of the order of 0.05-0.4 m/s. The vertical slots of the top of the first revert plate are dimensioned equally over the cross-section of the settler so that the flow rate of the organic phase flowing through them is in the range of 0.1-0.6 m/s.

The cross-section of the settler in FIG. 4 is drawn as a rectangular shape, but this embodiment of the invention is not limiting, rather the settler may be as required either square or a trapezoid that either narrows or widens towards the rear end, either narrowing or widening on both sides 3 and 4 or only on one side. When the settler is formed in the shape of a trapezium that narrows towards the rear end, the dispersion is pressed in yet a third direction in addition to the longitudinal and upward compression.

Figure 5:
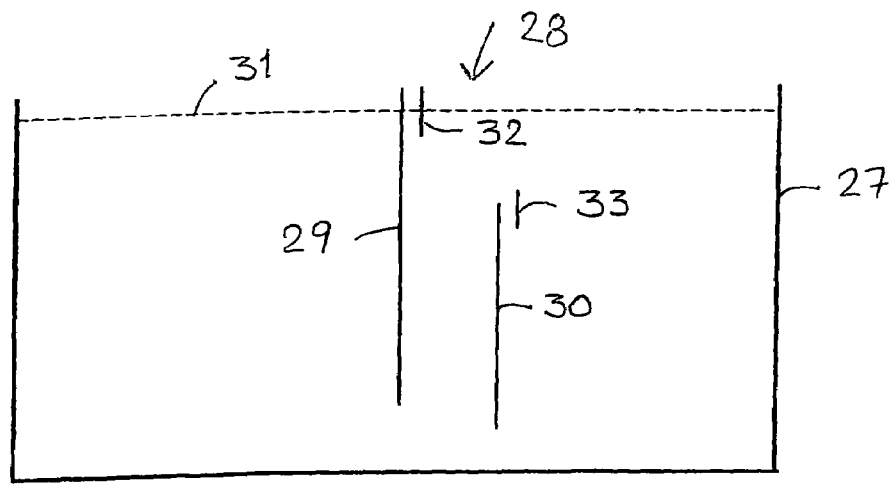
FIGS. 5-7 show a cross-section of a settler, where a revert member is located.

FIG. 5 is an example of one revert member 28 placed in a settler 27, which comprises two revert plates 29 and 30. The first revert plate 29 extends above the surface 31 of the organic solution. To simplify the drawing the vertical slotted section is not shown separately. Seen in the direction of flow baffle plates 32 and 33 are located behind the top of each revert plate, formed by vertical plate strips, which are placed in between the gaps in the top of the revert plate. The baffle plates are in the form of a downward-facing comb, so that their upper edge is fixed. The distance of the baffle plates from the revert plate is 2-3 times the width of the revert plate slot. Vertical flow channels are formed between the strips, with a width much greater than that of the strips themselves. In this way it is possible to slow down and even out the flow entering the settler extension, which is conducive for improving the separating properties of the settler. The height of the baffle plates can be changed.

Figure 6:
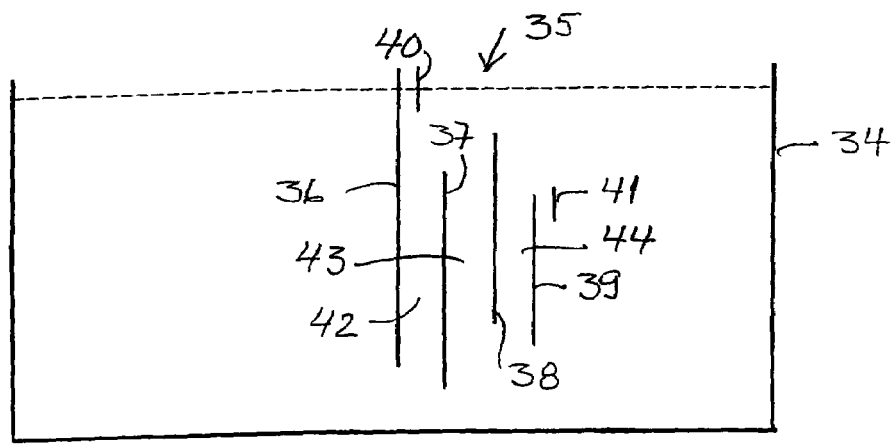

FIG. 6 represents a simplified settler 34, into which one revert member 35 has been placed, which in this case consists of four revert plates 36, 37, 38, and 39. Baffle plates 40 and 41 have again been placed in front of the top of the first and last revert plates. In the case of this drawing the dispersion flow has to flow through three revert channels, 42, 43 and 44, wherein the flow is almost vertical, either upward or downward. Vertical flows are excellent for making solutions separate from each other.

Figure 7:
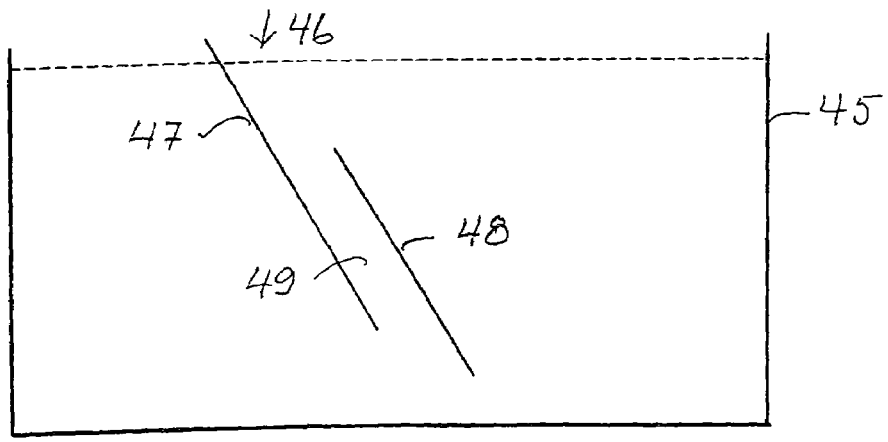

FIG. 7 shows an example of a settler 45 with only one revert member 46, which is formed of two revert plates 47 and 48. The revert plates are now positioned at an angle rather than being upright, but the dispersion band moving forward in revert channel 49 nevertheless has in effect to rise vertically between the revert plates. Revert plates can therefore be positioned at an angle of between 50° and 90° to the horizontal. The inclination may be either towards the settler feed end as in FIG. 7 or they may be inclined towards the rear end of the settler. The inclination shown in FIG. 7 is a better alternative than the latter. It is appropriate to use inclined revert members when treating solutions that separate poorly.

EXAMPLE 1

A settler was used in the test, which was a trapezoid in shape with one side narrowing. The separation capacity and efficiency of the settler was measured in the test and at the same time the evenness of the dispersion flow was monitored as well as the accumulation of the dispersion against the revert member. The width of the settler feed end was 1250 mm and the width of the discharge end 915 mm. The length of the settler was 620 mm and the effective solution depth 1500 mm.

The settler was equipped with a symmetrical V-type directional member and revert member in accordance with the invention. The distance of the tip of the first plate of the directional member from the feed end was 165 mm. The distance of the first plate of the directional member from the feed end at the sidewalls of the settler was 20 mm. The first revert plate of the revert member was 410 mm from the settler feed end. The revert member was placed upright and extended from one side of the settler to the other. The width of the settler at the revert member was 1000 mm. The revert plates were installed at a distance of 33 mm from each other, thus forming a revert channel between them.

The first revert plate was 340 mm from the bottom of the settler and the second 70 mm. The first revert plate was placed in the settler at a height where its upper edge was 80 mm above the surface of the organic layer. The upper part of the first revert plate included a slotted zone with about 40 three-millimetre-wide vertical slots. The height of the slotted zone was 130 mm. The upper edge of the second revert plate was provided with a slotted zone corresponding to the ones on the upper and lower edges of the first plate. In addition, a flow baffle plate was located behind the upper edge of the second revert plate (seen in the direction of flow), made up of 12-mm-wide vertical plates, the centre of which was at the point of the slots of the second revert plate slotted zone. The baffle plate was 5 mm from the revert plate.

10 m$^3$/h of the dispersion was fed into the settler. The dispersion was composed of a dilute copper sulphate solution with a pH of 1.4 and a solution of kerosene, into which a hydroxyomixe-type copper extractant had been mixed. The extractant content was 33% by volume. The kerosene solution appeared as droplets in the aqueous solution and the feed ration of the volume flows was 1.0. The temperature of the settler was 25° C.

Measurements showed that the dispersion moved forward as an even stream front in the front end of the settler, and accumulated in a 1070 mm thick layer in front of the first revert plate. The dispersion flowed evenly into the revert channel between the revert fences and from there on into the next section of the settler, where the dispersion settled in a 560 mm-thick layer. The thickness of the layer of separated organic solution before the revert member was 40 mm and after it 120 mm. It was found that a large dispersion feed was required for the dispersion to reach the slotted zone of the first revert plate and to be discharged from there into the revert channel.

The measurements carried out showed that the amount of organic solution in the aqueous solution was only 4 ppm and that the amount of aqueous solution in the organic solution was 130 ppm. The amount of aqueous solution in the organic was a good result, when considering that the loading level of the dispersion in the settler was high, at 14.9 m$^3$/m$^2$ h. Such a loading is about three times that which is possible in settlers of the prior art.

The invention claimed is:

1. A method for the recovery of metals in a separation section of a liquid-liquid extraction process by guiding a dispersion formed of an aqueous solution and an organic solution evenly over the cross-section of a separation section, the method comprising:

a) equipping a feed end of the extraction separation section with a directional member, said directional member comprising at least two essentially solid directional plates each connected from one sidewall to the opposite sidewall, wherein the lower edge of the directional plates slopes from the sidewalls of the settler downwards towards the centre at an angle of 0.2-2° in relation to the horizontal;
b) feeding the dispersion from the extraction mixing section into the centre of the feed end of the separation section; and
c) routing the bulk flow of the dispersion under the first directional plate of the directional member causing the dispersion to flow into an essentially vertical upwards direction in a directional channel formed between the directional plates, and causing the dispersion to flow over the second directional plate.

2. The method according to claim 1, wherein the directional member is directed from the sides of the separation section towards the centre.

3. The method according to claim 1, wherein the directional member is essentially V-shaped when seen from above.

4. The method according to claim 1, wherein the number of directional plates in the directional member is 2, 3 or 4.

5. The method according to claim 1, wherein the pressure drop created by the directional member is in the range of 100-200 Pa.

6. The method according to claim 1, further comprising
a) causing the phases separated from the directed dispersion to flow freely in the direction of the longitudinal axis of the separation section;
b) damming up a dispersion band remaining between the separated phases by means of at least one revert member connected from one sidewall of the separator to the opposite sidewall that is perpendicular to the longitudinal axis of the settler, said at least one revert member comprising at least two revert plates; and
c) causing the dispersion to flow locally in a vertical direction in a revert channel, wherein said revert channel is formed by the space between said revert plates.

7. The method according to claim 6 further comprising
(a) extending the upper edge of the first revert plate of the revert member into the organic solution; and
(b) causing a portion of the organic solution to flow through a slotted zone at the top of the first revert plate.

8. The method according to claim 6, further comprising causing the dispersion band dammed up using the first-revert plate of the revert member to flow under the first revert plate into the revert channel.

9. The method according to claim 6, further comprising causing the portion of the dispersion that has flowed into the revert channel of the revert member to flow over the second revert plate of the revert member into the separation section after the revert member.

10. The method according to claim 6, wherein the number of revert members located in the separation section is 1-6.

11. The method according to claim 6, wherein the number of revert plates in the revert member is 2-6.

12. The method according to claim 1, wherein the metal to be recovered is copper, uranium, cobalt, nickel or zinc.

13. Equipment for guiding a dispersion formed of an aqueous solution and an organic solution evenly over the cross-section of a separation section in connection with the recovery of metals in a liquid-liquid extraction settler, said settler comprising a feed end, sidewalls, rear end, and bottom, said equipment comprising a directional member in the feed end of the settler connected from one sidewall to the opposite sidewall, comprising at least two essentially solid directional plates situated at different heights, wherein the outer edges of each directional plate are connected to both sidewalls of the settler, and wherein the lower edge of the directional plates slopes from the sidewalls of the settler downwards towards the centre at an angle of 0.2-2° in relation to the horizontal.

14. The equipment according to claim 13, wherein the directional member is V-shaped when seen from above.

15. The equipment according claim 13, wherein the upper edge of the directional plates slopes from the sidewalls of the settler upwards towards the centre at an angle of 0.2-2° in relation to the horizontal.

16. The equipment according to claim 13, wherein the first directional plate has slotted zones comprising vertical slots on its upper edge and lower edge.

17. The equipment according to claim 16, wherein each slotted zone accounts for 3-15% of the total height of the plate.

18. The equipment according to claim 13, wherein the distance from the centre of the lower edge of the first directional plate to the bottom is 3-25% of the total depth of the solution in the settler.

19. The equipment according to claim 13, wherein the second directional plate has a slotted zone comprising vertical slots on its upper edge.

20. The equipment according to claim 19, wherein the height of the slotted zone on the upper edge of the second directional plate accounts for 3-15% of the total height of the plate.

21. The equipment according to claim 13, wherein the distance from the centre of the lower edge of the second directional plate to the bottom is 0.5-5% of the total depth of the solution in the settler.

22. The equipment according to claim 13, wherein the upper edge of the second directional plate is below the surface of the solution in the settler at a depth that corresponds to 10-20% of the depth of the solution in the settler.

23. Equipment for guiding a dispersion formed of an aqueous solution and an organic solution evenly over the cross-section of a separation section in connection with the recovery of metals in a liquid-liquid extraction settler, said settler comprising a feed end, sidewalls, rear end, and bottom, said-equipment comprising a directional member in the feed end of the settler connected from one sidewall to the opposite sidewall, comprising at least two essentially solid directional plates situated at different heights, wherein the outer edges of each directional plate are connected to both sidewalls of the settler, and wherein the lower edge of the directional plates slopes from the sidewalls of the settler downwards towards the centre at an angle of 0.2-2° in relation to the horizontal, said settler further comprising at least one revert member connected from one sidewall to the opposite sidewall and perpendicular to the longitudinal axis of the settler, the revert member comprising at least two revert plates located at different heights.

24. The equipment according to claim 23, wherein the number of revert members is 1-6.

25. The equipment according to claim 23, wherein the number of revert plates in the revert member is 2-6.

26. The equipment according to claim 23, wherein the first revert plate of the revert member and subsequently every other revert plate after the first revert plate is located higher than the second revert plate and every other revert plate after the second revert plate.

27. The equipment according to claim 23, wherein the upper edge of the first revert plate is located above the surface of the liquid in the settler.

28. The equipment according to claim 23, wherein the distance from the lower edge of the first revert plate to the bottom of the settler is 12-50% of the total depth of the solution in the settler.

29. The equipment according to claim 23, wherein the revert plates are mainly solid when seen in elevation.

30. The equipment according to claim 23, wherein the first revert plate consists of a slotted zone comprising vertical slots along the upper edge wherein said slots have a length that is 5-15% of the total height of the revert plate.

31. The equipment according to claim 23, wherein the first revert plate and thereafter every other revert plate after the first revert plate consists of a slotted zone comprising vertical slots along the lower edge wherein said slots have a length that is 5-15% of the total height of the revert plate.

32. The equipment according to claim 23, wherein the second revert plate and subsequently every other revert plate after the second revert plate consists of a slotted zone comprising vertical slots along the upper edge wherein said slots have a length that is 5-15% of the total height of the revert plate.

33. The equipment according to claim 23, wherein the distance from the lower edge of the second revert plate to the bottom of the settler is 5-35% of the total depth of the solution in the settler.

34. The equipment according to claim 23, wherein the distance from the upper edge of the second revert plate to the surface of the solution is 12-35% of the total depth of the solution in the settler.

35. The equipment according to claim 23, wherein the revert plates of the revert member are located in the settler at an angle of 50-90° in relation to the horizontal.

* * * * *